United States Patent [19]

Tanaka

[11] Patent Number: 4,791,601

[45] Date of Patent: Dec. 13, 1988

[54] PARALLEL MULTIPLIER WITH A MODIFIED BOOTH ALGORITHM

[75] Inventor: Shigeru Tanaka, Fujisawa, Japan

[73] Assignee: Kabushiki Kaisha Toshiba, Kawasaki, Japan

[21] Appl. No.: 888,080

[22] Filed: Jul. 22, 1986

[30] Foreign Application Priority Data

Jul. 23, 1985 [JP] Japan .................................. 60-162541

[51] Int. Cl.$^4$ .............................................. G06F 7/52
[52] U.S. Cl. ................................................ 364/760
[58] Field of Search ........................................ 364/760

[56] References Cited

U.S. PATENT DOCUMENTS 4,153,938 5/1979 Ghest et al. ........................... 364/760
4,484,301 11/1984 Borgerding et al. .................. 364/760
4,575,812 3/1986 Kloker et al. ......................... 364/760
4,646,257 2/1987 Essig et al. ............................ 364/760

Primary Examiner—David H. Malzahn
Attorney, Agent, or Firm—Finnegan, Henderson Farabow, Garrett and Dunner

[57] ABSTRACT

A parallel multiplicator including adder circuits based on Booth's algorithm is disclosed. All of the adders of a plurality of rows are constructed based on the carry save system. When the negative partial-product signal is input, the "2's complement" generating signals CB0 to CB3 for the LSB of the negative partial-product signal are input to the bit adder in the lowest order row which corresponds to the LSB of the negative partial-product signal.

7 Claims, 3 Drawing Sheets

PARALLEL MULTIPLIER WITH A MODIFIED BOOTH ALGORITHM

BACKGROUND OF THE INVENTION

This invention relates to a parallel multiplier with an operand of number data, and more particularly to a partial-product adder circuit, which is used in a parallel multiplier based on Booth's algorithm.

There have been proposed various types of algorithms for performing the parallel multiplication at a high speed. Some of these proposals are described in "NIKKEI ELECTRONICS", issued May 29, 1978, pp 76 to 89, and "High-Speed Operating of Computers", translated by Horigoe, issued by Kindai Kagaku-sha, pp 129 to 213. In the parallel multiplication based on the Booth's aloorithm described in "NIKKEI ELECTRONICS", to perform multiplication of multiplicand n bit and multiplier n bit (n×n bit), the number of the partial-products to be obtained is only n/2. The adder circuit for partial-product used in the 8×8 bit multiplier of Booth's algorithm is configured as shown in FIG. 1.

As shown, the multiplier contains three adder rows each made up of 11 full adders FA. In each adder row, the full adders of 9 upper order bits are of the carry save system, while the full adders of 2 lower order bits, are of the ripple carry system. In each adder row, the most significant bit is located on the left side, as viewed in the drawing. The least significant bit is located on the right side. The sum signal produced from each bit full adder in one full adder row is connected with the corresponding bit full adder of the higher order full adder row. In the figure, the uppermost full adder row is the lowest order row, and its significance order becomes higher toward the bottom of the drawing. The carry signal produced from one bit full adder in the lower order full adder row is connected to the bit full adder of the higher full adder row, which is one bit higher than the former bit full adder. The final full adder row is an adder I, based on the carry look ahead (CLA) mode. Such an arrangement needs only (m−1) adder rows, to add together the partial-product signals of m. In this example, the product signals are four, X0 to X3, each consisting of 8 bits. Therefore, it is possible to reduce the chip size and to speed up the operation. These signals X0 to X3 are selected by the output signal from a decoder (not shown) in which five types of partial-products for multiplicand X, −X, 2X, −2X, and 0 (or 1), decode multiple Y on the basis of a predetermined logic formula. The 8-bit data of partial-product signal X0 is input to the lower order 8-bit adder of the lowest order full adder row (the uppermost row in the drawing). The 8-bit data of the partial-product signal X1 is input to the upper order 8-bit adder of the lowest order full adder row. The 8-bit data of the partial-product signal X2 is connected to the upper order 8-bit adder of the full adder row one digit higher than the lowest order full adder row (the second row from the top). The partial-product signal X3 is connected to the upper order 8-bit adder of the full adder row (the third row from the top). The two higher order bit adders of each adder row are coupled with one bit signal SB for code-processing the input partial-products. When the input partial-product is negative (−X or −2X), signals CB0 to CB3 (which are all 1) for generating "2's complement" are input to the least significant bit of the product. Signals CB1 to CB3, except CB0, are input to the least significant bit adder of the adder row one digit higher than the row to which the negative partial-product is applied. Specifically, if X1 is the negative partial-product signal, this signal is applied to the 1 to 8 bit adders of the lowest order row R1. In this case the signal CB1 for the "2's complement" generation is input to the adder of the least significant bit 11 of the other row R2, which is one digit higher than the row R1. In the case that the one digit higher row is a CLA type adder I, the signal CB1 is input to the carry input terminal Cin.

In the conventional partial-product adder circuit, the carry signal is propagated in the two lower order bit adders in the ripple carry mode. Therefore, the time for multiplication is increased by the propagation time. This presents a problem. To solve this problem, if the CLA system is used for the two lower order bit additions in each adder row, the hardware of the circuit is increased and the regularity of the circuit pattern is degraded. In this respect, such an approach is inappropriate for IC fabrication. To keep the pattern regularity, if the carry save system, not the ripple carry system, is applied to all of the other rows, it is necessary to increase the number of bits by the number corresponding to the two lower order bits in the CLA type adder I. For this reason, it is impossible to form a pattern for inputting the "2's complement" generating signal CB3 to the carry signal input terminal Cin of the adder 1.

SUMMARY OF THE INVENTION

Accordingly, an object of this invention is to provide a parallel mulitplier based on Booth's algorithm, which can provide good regularity of the circuit pattern of the partial-product adder circuit, easy pattern design with a high integration density, and high speed operation.

According to the present invention, there is provided a parallel multiplier comprising: a plurality of adder rows each including a plurality of adders, a partial-product signal being input to each of the adder rows, the adders in the upper order row being connected to those of the lower order row in a carry save mode; and means in which when the partial-product signal is negative, the means inputs a "2's complement" generating signal to the adder of those in the lowest order row, whose bit corresponds to the LSB of the negative partial-product signal.

DETAILED DESCRIPTION OF THE PREFERRED EMBODIMENTS

Some specific preferred embodiments of a parallel multiplier according to this invention will be described referring to the accompanying drawings.

Figure 1:
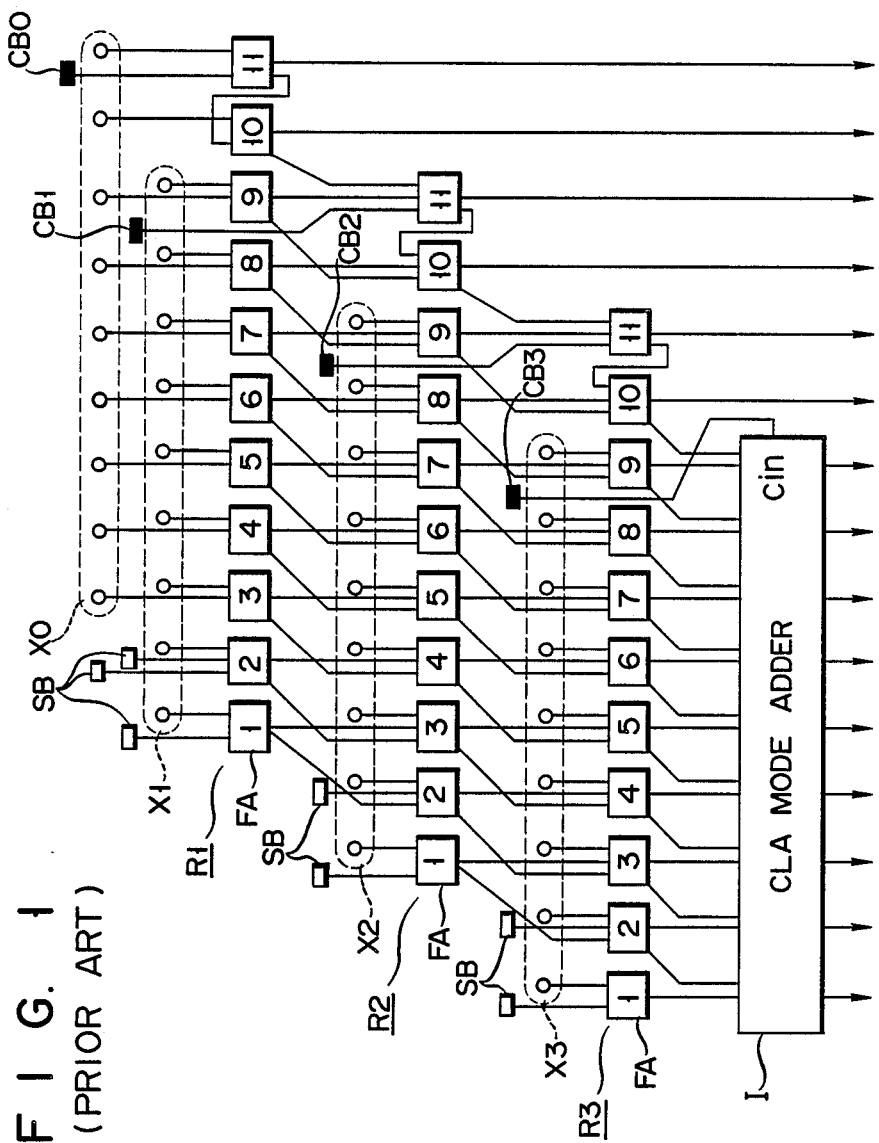
FIG. 1 shows a circuit diagram of a conventional parallel multiplier.
Figure 2:
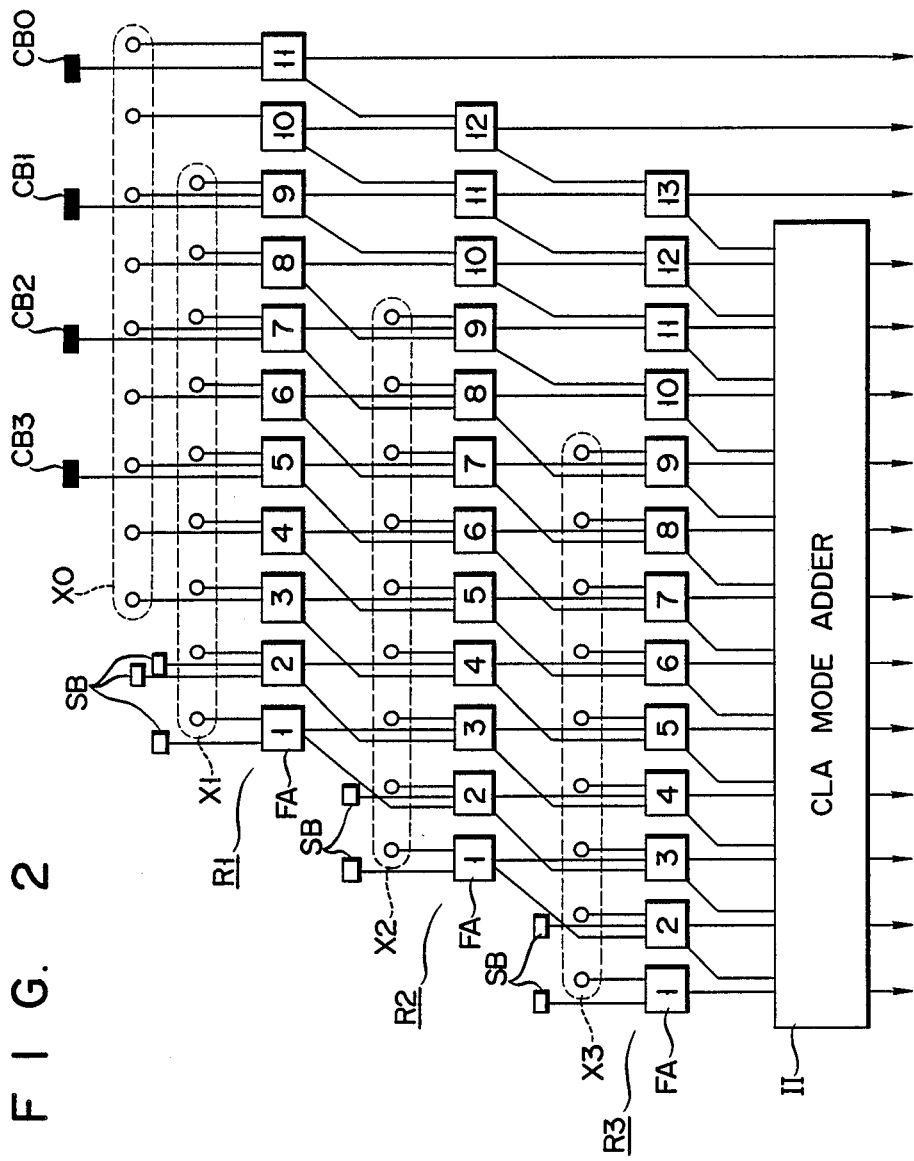
FIG. 2 shows a circuit diagram of an embodiment of a parallel multiplier according to this invention.

FIG. 2 shows the partial, product adder circuit of a parallel multiplier according to one embodiment of this invention. The adder circuit is for the 8×8 parallel multiplier.

The adder contains three adder rows R1 to R3 each consisting of a plurality of three-input and two-output full adder FA. In the figure, the uppermost row R1 indicates the lowest order row. The significance order of the rows becomes higher toward the bottom of the drawing. That is, the significance order of the rows R1 to R3 is higher in this order. In each row, the most significant bit (MSB) adder is the farthest left bit adder, indicated as 1. The significance order of the bit adder in this row becomes lower toward the right. The bit adder denoted as 11 is the least significant bit adder. The digits attached to the bit adders indicate the significance order of the bit adders in that adder row. These adders are arrayed as shown. It is noted that this example employs only the carry save system for adder configuration and not the ripple carry system. Therefore, the carry signal generated by one of the bit adders of one of the rows is input to the bit adder one bit higher than the corresponding one of the next higher order row. For example, the carry signal generated by the adder of the least significant bit 11 in the adder row R1, is input to the bit 12 adder of the adder row R2. The final row is made up of the CLA type adder II.

Nine bits of the partial-product input signal X0 are input to bits 3 to 11 of the adder row R1. Nine bits of the input signal X1 are input to the adders corresponding to bits 1 to 9 of the adder row R1. Nine bits of the input signal X2 are applied to bits 1 to 9 of adder row R2. Similarly, nine bits of the signal X3 are applied to bits 1 to 9 of adder row R3. These partial-product signals X0 to X3 are selected by the output signal from a decoder (not shown) in which five types of partial-products for multiplicand X, −X, 2X, −2X, and 0 (or 1), decode multiple Y on the basis of a predetermined logic formula.

Each adder of the adder row R1 adds together the input signals and produces the sum output signal and a carry signal. The sum output signal from each adder of the row R1 is input to the corresponding bit adder of the next higher order row. More specifically, the sum output of the bit 10 adder of the row R1, for example, is input to the least significant bit 12 adder of the adder row R2. The carry signal of the least significant bit adder of adder row R1 is input to the least significant bit adder of adder row R2. The sum output of the adders of row R2 and the carry signal are similarly input to the adders of row R3. The carry signal of the adders of row R3, and the sum output are input to the CLA type adder II of the last row.

The one bit additional signal SB for code processing of the partial-product input is input to the upper order two bit adders of each adder row. When the partial-product input is negative (−X or −2X), the additional signal SB inverts the negative partial-product to a positive partial-product. The "2's complement" generating signals CB0 to CB3 are input to the least significant bit of the positive partial-product input. The number of signals CB corresponds to the numbers of rows R and final stage CLA adder. It is noted here that these signals CB0 to CB3 are all applied to the lowest order row R1, not the other row to which the negative partial-product is input. To be more specific, these signals are applied to the bit adders of those in the lowest order row R1, which correspond to those to which the least significant bits of the partial-products X0 to X3 are input in each row. For example, in the adders of row R1, if the inputs X0 to X3 are negative, the "2's complement" generating signal CB0 for the LSB of the product X0 is input to the adder of the LSB 11. The signal CB1 for the LSB of the product X1 is input to the adder of the third bit 9 from the LSB. Further, the signal CB2 is input to the LSB of the product X2, which is input to the adder of the fifth bit 7 from the LSB. Similarly, the signal CB3 for the LSB of product X3 is input to the adder of the seventh bit 9 from LSB.

In the partial-product adder circuit, as described above, the "2's complement" generating signals CB0 to CB3 are all input to the adders of the lowest order rows, which correspond to the LSBs of the product inputs X0 to X3. Therefore, the same addition result as that by the conventional device can be obtained. Further, the operation is completely based on the carry save system. This indicates that the operation is performed at a high speed. Additionally, the "2's complement" generating signals CB0 to CB3 are all input to the LSB adders, and the carry save system is employed. Therefore, the circuit pattern has a high regularity, and the pattern design for IC fabrication is made easy.

Figure 3:
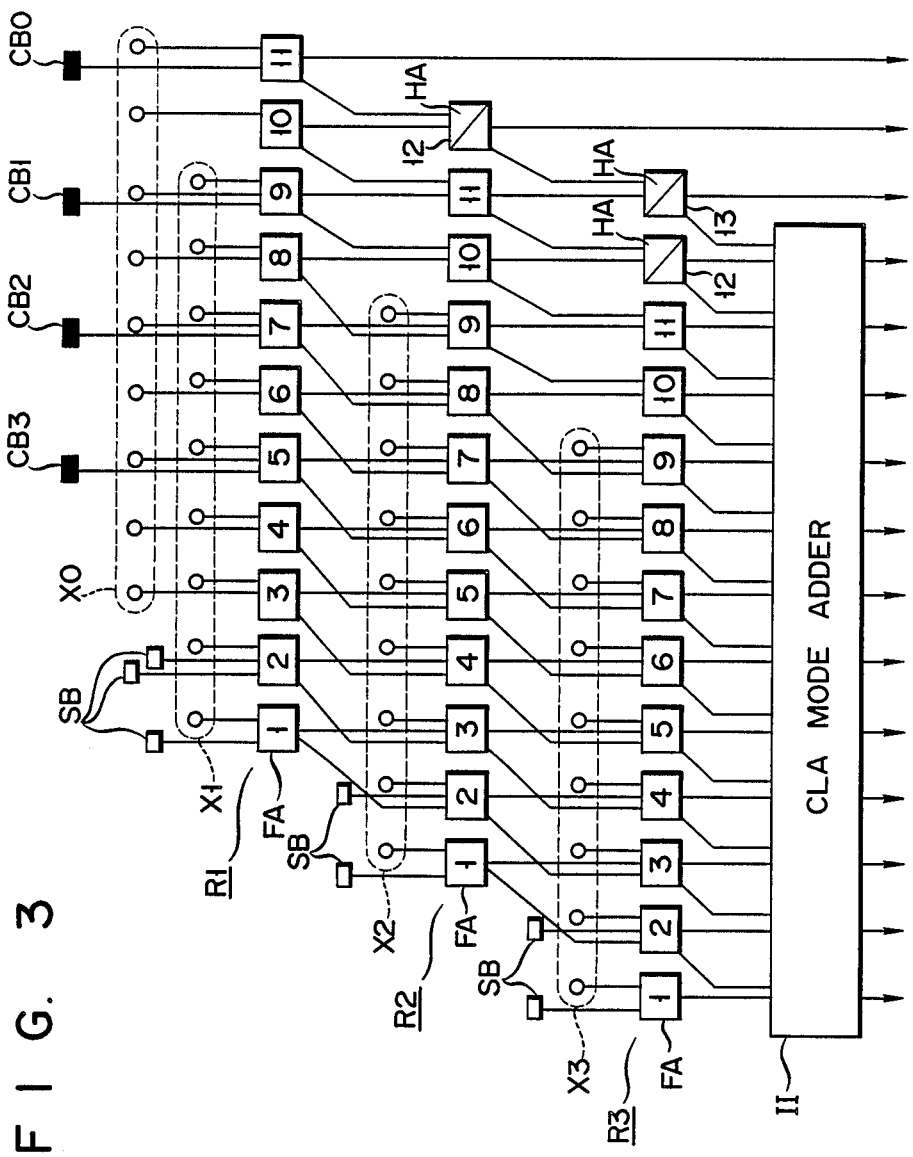
FIG. 3 shows a circuit diagram of another embodiment of a parallel multiplier according to this invention.

While in the above-mentioned embodiment, the adders used are all full adders, some of these adders may be replaced by half-adders if necessary. An embodiment of a parallel multiplier according to this invention, which is constructed using the half-adders, is illustrated in FIG. 3. In the figure, the half-adders are shown by blocks with slanted lines and denoted as HA.

From the foregoing, it is seen, that this invention successfully provides a parallel multiplier which can provide good pattern regularity of the partial-product adder circuit, easy pattern design for IC fabrication of the multiplier circuit, and high speed operation.

What is claimed is:

1. A parallel multiplier circuit for forming a product of a binary multiplier value and a binary multiplicand value from a plurality of partial products determined from said binary multiplier and multiplicand values, each of said plurality of partial products corresponding to a different binary bit of said multiplier value such that each of said partial products has a relative significance reflecting the relative bit significance of the corresponding multiplier bit, said parallel multiplier circuit comprising:

a plurality of rows of adder circuits arranged in an order of successively-increasing significance from a lowest-order adder row to a highest-order adder row, the adders in said lowest-order adder row receiving as inputs the two partial products with the lowest relative significance, and and the adders in each successively higher order row of adders receiving as inputs the one of the partial products with the next higher relative significance and an output from the adders in the next lower order row of adders, wherein each of said rows of adders includes at least one carry save adder, and wherein the number of said adders in each of said rows of adders increases from said lowest-order adder row to said highest-order adder row;

negative product correcting means for supplying a first correction signal to the ones of said adder rows receiving negative partial-products signals, and for providing a second correction signal as an input to the adders in said lowest-order row of adders; and a final adder coupled to the outputs of said highest order row of adders to form said product.

2. A parallel multiplier circuit according to claim 1, in which said plurality of said adders are arranged in an array fashion.

3. A parallel multiplier circuit according to claim 1, in which said plurality of said adders are full adders.

4. A parallel multiplier circuit according to claim 1, in which some of said plurality of said adders are half adders.

5. A parallel multiplier circuit according to claim 1, in which said final adder comprises adders of the carry look ahead type.

6. The parallel multiplier circuit according to claim 1 wherein selected ones of said adders in said lowest-order row of adders each correspond to a different one of said partial products, and wherein said negative product correcting means includes means for forming said second correction signal to include a different value adjusting bit for each of said negative partial products, and means for aligning said second correction signal such that each of said adders in said lowest-order row of adders which corresponds to a negative partial product receives a corresponding value adjusting bit from said second correction signal.

7. The parallel multiplier circuit according to claim 1 wherein the number of said adders in each of said rows of adders increases unitarily from said lowest-order adder row to said highest-order adder row.

* * * * *